US008181445B2

(12) United States Patent
Duvinage et al.

(10) Patent No.: US 8,181,445 B2
(45) Date of Patent: May 22, 2012

(54) DEVICE AND METHOD FOR EXHAUST GAS AFTERTREATMENT

(75) Inventors: Frank Duvinage, Kirchheim (DE); Berthold Keppeler, Owen (DE); Bernd Krutzsch, Denkendorf (DE); Markus Paule, Korb (DE); Michel Weibel, Stuttgart (DE)

(73) Assignee: Daimler AG, Stuttgart (DE)

( * ) Notice: Subject to any disclaimer, the term of this patent is extended or adjusted under 35 U.S.C. 154(b) by 428 days.

(21) Appl. No.: 10/552,263

(22) PCT Filed: Feb. 25, 2004

(86) PCT No.: PCT/EP2004/001824
§ 371 (c)(1),
(2), (4) Date: Sep. 12, 2006

(87) PCT Pub. No.: WO2004/090296
PCT Pub. Date: Oct. 21, 2004

(65) Prior Publication Data
US 2007/0028601 A1 Feb. 8, 2007

(30) Foreign Application Priority Data

Apr. 5, 2003 (DE) .................................. 103 15 593

(51) Int. Cl.
*F01N 3/00* (2006.01)
(52) U.S. Cl. ............... 60/286; 60/295; 60/297; 60/301; 60/303; 48/197 R; 48/198.7
(58) Field of Classification Search ..................... 60/286, 60/274, 295, 297, 301, 303, 311; 48/197 R, 48/198.7
See application file for complete search history.

(56) References Cited

U.S. PATENT DOCUMENTS

| 5,272,871 A | * | 12/1993 | Oshima et al. | .................. 60/274 |
| 5,727,385 A | * | 3/1998 | Hepburn | .......................... 60/297 |
| 5,746,989 A | * | 5/1998 | Murachi et al. | ............. 423/213.7 |
| 5,809,774 A | * | 9/1998 | Peter-Hoblyn et al. | ......... 60/274 |
| 5,974,793 A | * | 11/1999 | Kinugasa et al. | ................ 60/285 |
| 6,047,542 A | * | 4/2000 | Kinugasa et al. | ............... 60/274 |

(Continued)

FOREIGN PATENT DOCUMENTS

DE 196 26 835 A1 1/1997

(Continued)

OTHER PUBLICATIONS

German Office Action dated Nov. 12, 2003 and its English translation.

(Continued)

*Primary Examiner* — Binh Q Tran
(74) *Attorney, Agent, or Firm* — Crowell & Moring LLP

(57) ABSTRACT

The exhaust gas aftertreatment device according to the invention having a reforming unit for generating hydrogen by steam reforming, partial oxidation of hydrocarbons and/or mixed forms thereof is distinguished by the fact that the reforming unit is arranged directly in the main exhaust gas stream from an internal combustion engine. The steam and residual oxygen which are required for the reforming preferably originate from the exhaust gas. The step of providing the required reducing agents consists in briefly switching the internal combustion engine, which is predominantly operated in lean-burn mode and the exhaust gas from which is undergoing the aftertreatment, to rich-burn mode, allowing reforming by means of the reforming reactor according to the invention using the hydrocarbons that are present in the exhaust gas.

11 Claims, 6 Drawing Sheets

U.S. PATENT DOCUMENTS

| | | | |
|---|---|---|---|
| 6,122,909 A * | 9/2000 | Murphy et al. | 60/286 |
| 6,125,629 A * | 10/2000 | Patchett | 60/286 |
| 6,254,842 B1 * | 7/2001 | Hu et al. | 423/213.5 |
| 6,560,958 B1 * | 5/2003 | Bromberg et al. | 60/275 |
| 6,655,130 B1 * | 12/2003 | Kirwan et al. | 60/284 |
| 6,718,753 B2 * | 4/2004 | Bromberg et al. | 60/275 |
| 6,725,647 B2 * | 4/2004 | Pfeifer et al. | 60/274 |
| 6,732,506 B2 * | 5/2004 | Patterson et al. | 60/285 |
| 6,732,507 B1 * | 5/2004 | Stanglmaier et al. | 60/285 |
| 6,745,560 B2 * | 6/2004 | Stroia et al. | 60/286 |
| 6,810,658 B2 * | 11/2004 | Kaupert et al. | 60/274 |
| 6,845,610 B2 * | 1/2005 | Shiino et al. | 60/286 |
| 6,964,156 B2 * | 11/2005 | Liu et al. | 60/274 |
| 6,981,367 B2 * | 1/2006 | Childs et al. | 60/275 |
| 7,043,902 B2 * | 5/2006 | Nakanishi et al. | 60/286 |
| 7,063,642 B1 * | 6/2006 | Hu et al. | 477/100 |
| 7,093,428 B2 * | 8/2006 | LaBarge et al. | 60/286 |
| 7,152,394 B2 * | 12/2006 | Benz et al. | 60/286 |
| 7,178,331 B2 * | 2/2007 | Blakeman et al. | 60/301 |
| 7,189,374 B1 * | 3/2007 | Hawker | 422/168 |
| 7,332,135 B2 * | 2/2008 | Gandhi et al. | 422/177 |
| 7,434,387 B2 * | 10/2008 | Yan | 60/286 |
| 7,472,545 B2 * | 1/2009 | Hemingway et al. | 60/286 |
| 2004/0006975 A1 * | 1/2004 | Stroia et al. | 60/286 |
| 2004/0076565 A1 * | 4/2004 | Gandhi et al. | 423/235 |
| 2007/0056268 A1 * | 3/2007 | McCarthy | 60/286 |

FOREIGN PATENT DOCUMENTS

| | | |
|---|---|---|
| DE | 197 31 623 A1 | 1/1999 |
| DE | 198 27 195 A1 | 12/1999 |
| DE | 100 25 044 C1 | 11/2001 |
| DE | 101 35 646 A1 | 6/2002 |
| DE | 101 20 097 A1 | 11/2002 |
| DE | 101 28 414 A1 | 12/2002 |
| DE | 101 42 397 A1 | 2/2003 |
| EP | 0 537 968 A1 | 4/1993 |
| EP | 0 560 991 A1 | 9/1993 |
| EP | 0 957 242 A2 | 11/1999 |
| EP | 1 027 919 A2 | 8/2000 |
| EP | 1 226 861 A1 | 12/2001 |
| EP | 1 211 394 A2 | 6/2002 |
| JP | 05106430 A | 4/1993 |
| JP | 06074031 A | 3/1994 |
| JP | 07208153 A | 8/1995 |
| JP | 08303227 A | 11/1996 |
| JP | 2001140630 A | 5/2001 |
| JP | 2002242667 A | 8/2002 |
| WO | WO 00/76637 A1 | 12/2000 |
| WO | WO 02/100519 A1 | 12/2002 |

OTHER PUBLICATIONS

International Search Report (Jun. 9, 2004).

Jones et al., "Exhaust-Gas Reforming of Hydrocarbon Fuels," *SAE Technical Paper Series*, Society of Automotive Engineers, Warrendale, PA, US, 1993, pp. 223-234, XP008010384, ISSN: 0148-7191.

* cited by examiner

DEVICE AND METHOD FOR EXHAUST GAS AFTERTREATMENT

BACKGROUND AND SUMMARY OF THE INVENTION

The invention relates to an apparatus and a method for exhaust gas aftertreatment for mobile applications.

It is essential to comply with appropriate statutory emission regulations if motor vehicles with spark-ignition and in particular diesel engines are to be used. In this context, catalytic reduction of $NO_x$ using hydrogen is regarded as advantageous. This catalytic removal of nitrogen oxides from the combustion exhaust gases of motor vehicles is carried out using hydrogen at suitable catalytic converters in accordance with the reaction $2NO+2H_2 \rightarrow N_2+2H_2O$.

In some of the known methods for removing nitrogen oxides by $NO_x$ reduction, the hydrogen required for the reaction is carried along in the vehicle, e.g., in pressurized tanks, liquid hydrogen tanks or metal hydride stores. One drawback of this process is that large, heavy tanks are required to carry the hydrogen, and moreover these tanks only have a very limited capacity, which requires short top-up intervals.

EP 537 968 A1 has disclosed an apparatus for the catalytic reduction of nitrogen oxides in exhaust gases from motor vehicles with hydrogen being supplied. The hydrogen is generated onboard the motor vehicle by partial oxidation or reforming of methanol at a suitable catalytic converter. The catalytic converters are heated by virtue of being arranged in the hot exhaust-gas stream from the engine.

DE 101 20 097 A1 has disclosed an exhaust gas purification system in a vehicle with a reforming reactor for extracting hydrogen from fuel, in which system the hydrogen can be fed to an exhaust gas stream in an exhaust pipe an internal combustion engine upstream of an exhaust gas catalytic converter. The reforming reactor has a feed device for oxygen and/or water and is connected to a secondary branch of the exhaust pipe, it being possible for oxygen and water for reforming to be supplied in the form of an exhaust gas part-stream via the secondary branch.

To enable the arrangement of the respective components for exhaust gas purification in the abovementioned patent documents to be implemented, it is necessary to provide a correspondingly large installation space for the exhaust gas aftertreatment apparatus, which is consequently relatively unwieldy.

Therefore, it is an object of the invention to provide a method and an apparatus for exhaust gas aftertreatment which can be used to optimize the installation space so as to effect a more compact design.

The invention solves this problem by providing an exhaust gas aftertreatment device and an exhaust gas aftertreatment method, both of which are described and claimed hereinafter.

The exhaust gas aftertreatment device according to the invention having a reforming unit for generating hydrogen by steam reforming, partial oxidation of hydrocarbons and/or mixed forms thereof is distinguished by the fact that the reforming unit is arranged directly in the main exhaust gas stream from an internal combustion engine. The steam and residual oxygen which are required for the reforming preferably originate from the exhaust gas. The step of providing the required reducing agents consists in briefly switching the internal combustion engine, which is predominantly operated in lean-burn mode and the exhaust gas from which is undergoing the aftertreatment, to rich-burn mode, allowing reforming by means of the reforming reactor according to the invention using the hydrocarbons which are present in the exhaust gas. Various specific measures for controlling the air/fuel ratio, also referred to as the air ratio λ for short, have already been proposed for this purpose, cf. for example laid-open specifications EP 0 560 991 A1 and DE 196 26 835 A1.

In the reforming unit, an exothermic partial oxidation in the presence of residual oxygen or an endothermic steam reforming operation in the absence of oxygen takes place. The combination of the two processes, which is characterized by an excellent heat balance, is referred to as autothermal reforming. Furthermore, the reforming reactor can also be operated as what is known as an autothermal reforming reactor, or ATR reactor for short.

During the reforming, the hydrocarbons in the exhaust gas are substantially converted into a CO—and $H_2$—containing gas mixture (synthesis gas). The reducing agents hydrogen ($H_2$), carbon monoxide (CO) and/or unburned hydrocarbons (HC) which are present here are subsequently used for the reduction of nitrogen oxides.

The apparatus according to the invention and the method according to the invention for exhaust gas aftertreatment, by virtue of the use of a reforming reactor or a reforming unit in the full flow of exhaust gas allow the synthesis gas yield in rich-burn mode to be optimized, which leads in an extremely advantageous way to an improvement to the $NO_x$ and sulfur regeneration of the $NO_x$ storage catalytic converters and to a reduction in the HC emissions which occur. In addition, the $NH_3$ yield in rich-burn mode on the $NO_x$ storage catalytic converter can be optimized.

Cyclical rich-burn mode can be implemented either engine-internally (e.g., afterinjection of fuel into the combustion chamber of the internal combustion engine or throttling), by a secondary injection into the exhaust gas stream upstream of the reforming reactor and/or by a combination of the two options. $NO_x$ which is produced in rich-burn mode is substantially broken down by reduction under the reforming conditions.

In lean-burn mode, the reforming reactor behaves like an oxidation catalytic converter which is standard in the exhaust gas sector and reduces the gaseous emissions (HC, CO, $NO_x$) in the oxygen-rich exhaust gas. To allow a rapid cold start, the reforming unit may be equipped with a heating function, e.g., electrical, by means of a flame glow plug, etc.

In accordance with one aspect of the invention, an exhaust gas recirculation may optionally be provided downstream of the reforming unit. In rich-burn mode (λ<1), therefore, it is possible to supply reformate to the engine combustion. This advantageously leads to a drop in the untreated emission levels and at the same time to a lower fuel consumption.

In a refinement of the invention, the at least one exhaust gas catalytic converter, which is preferably an $NO_x$ storage catalytic converter which removes nitrogen oxides from lean exhaust gas by storing them as the exhaust gas flows through it and generates $N_2$ by reducing the stored nitrogen oxides when reducing exhaust gas flows through it, is arranged in the main exhaust gas stream downstream of the reforming unit. In addition, $NH_3$ can be generated by selecting suitable operating parameters. Furthermore, at least one further exhaust gas catalytic converter, which is preferably an SCR catalytic converter which reduces nitrogen oxides contained in the exhaust gas using $NH_3$ that has been generated by means of a nitrogen oxide storage catalytic converter or stores excess $NH_3$ and then makes it available as reducing agent in lean-burn mode, is arranged downstream of the $NO_x$ storage catalytic converter.

In a preferred configuration of the invention, the at least one exhaust gas catalytic converter, which is preferably an SCR catalytic converter which reduces nitrogen oxides contained in the exhaust gas using $NH_3$ that has been generated by means of the nitrogen oxide storage catalytic converter, is arranged in the main exhaust gas stream downstream of the reforming unit. Furthermore, at least one further exhaust gas catalytic converter, which is preferably an $NO_x$ storage catalytic converter which removes nitrogen oxides from lean exhaust gas by storing them as the exhaust gas flows through it and generates $N_2$ by reducing the stored nitrogen oxides when reducing exhaust gas flows through it, is arranged downstream of the SCR catalytic converter.

The use of nitrogen oxide storage catalytic converters, also known as $NO_x$ storage catalytic converters or $NO_x$ adsorber catalytic converters or NSC for short, is generally known for the post-engine lowering of the levels of nitrogen oxides in internal combustion engines operated in lean-burn mode. Lean-burn operating phases of the internal combustion engine correspond to adsorption phases of the nitrogen oxide storage catalytic converter, in which it oxidizes nitrogen monoxide (NO) to form nitrogen dioxide ($NO_2$) and then stores the latter in the form of nitrates. During brief, periodic regeneration or desorption phases, the stored nitrates are removed from the nitrogen oxide storage catalytic converter by being converted into nitrogen dioxide and then nitrogen monoxide. The latter is then reduced to nitrogen by suitable reducing agents.

A number of problem points are observed in this alternating adsorption/desorption operating sequence. For example, considerable quantities of the polluting gas ammonia ($NH_3$) may form in the regeneration phase as a result of hydrogen reacting with nitrogen monoxide and/or nitrogen dioxide, depending on the catalytic converter temperature, the exhaust gas composition and the material composition of the nitrogen oxide storage catalytic converter. During the transition from a lean exhaust gas atmosphere to a rich exhaust gas atmosphere, there is a risk of undesirable breakthroughs of nitrogen oxides on account of sudden nitrate decomposition if a suitable quantity of reducing agent is not provided sufficiently quickly. During the transition from a rich exhaust gas atmosphere to a lean exhaust gas atmosphere, the nitrogen oxide storage catalytic converter may be heated as a result of exothermic combustion reactions, with the result that nitrates which have already formed may decompose again and temporarily can no longer be stored, which can cause undesirable nitrogen oxide slippage. With this $NO_x$ storage catalytic converter technology, efficient lowering of the levels of nitrogen oxides is restricted to a relatively narrow temperature range approximately between 200° C. and 400° C., since at lower temperatures the oxidation of NO to $NO_2$ is inhibited and at higher temperatures the nitrates which have formed can no longer be stably stored in significant quantities and the thermodynamic equilibrium between NO and $NO_2$ increasingly shifts toward the side of the nitrogen monoxide. According to the invention, the provision of synthesis gas expediently results in improved $NO_x$ regeneration at a lower temperature, which in turn has an advantageous effect on the ageing properties and efficiency of the $NO_x$ storage catalytic converter.

Typical $NO_x$ storage catalytic converters contain alkaline-earth metals and alkali metals, which are known for their nitrogen oxide storage capacity. Under lean conditions, the nitrogen oxides are converted as follows:

2NO+$O_2$→2$NO_2$ (Pt catalyst)

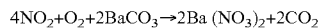
4$NO_2$+$O_2$+2BaCO$_3$→2Ba(NO$_3$)$_2$+2CO$_2$

Under rich exhaust gas conditions, nitrogen dioxide is desorbed again from the store and directly reacted with the carbon monoxide present in the exhaust gas to form nitrogen oxide:

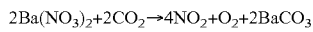
2Ba(NO$_3$)$_2$+2CO$_2$→4$NO_2$+$O_2$+2BaCO$_3$

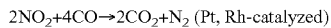
2$NO_2$+4CO→2$CO_2$+$N_2$ (Pt, Rh-catalyzed)

The switching times between lean and rich operating modes of the engine depend on the quantity of storage material used, the $NO_x$ emissions and the parameters which are typical of all catalyzed reactions, such as gas throughput and temperature.

A further problem point when using sulfur-containing fuels is what is known as the sulfur poisoning of the $NO_x$ storage catalytic converter caused by the accumulation of sulfates, which are more stable than the nitrates and do not decompose in the $NO_x$ regeneration phases. Therefore, special desulfating phases at an increased exhaust gas temperature and a rich exhaust gas composition are usually carried out from time to time in order to remove the sulfates, cf. for example laid-open specification DE 198 27 195 A1. In this case too, in accordance with the invention, the provision of synthesis gas expediently results in improved sulfur regeneration or removal at the $NO_x$ storage catalytic converter, likewise at a lower temperature, which in turn has an advantageous effect on the ageing properties of the $NO_x$ storage catalytic converter. During desulfating, the polluting gas hydrogen sulfide ($H_2S$) may form; the emission of this gas should be avoided. For this purpose, for example in patent DE 100 25 044 C1, it is proposed that secondary air be fed into the exhaust section during the desulfating phases in order to oxidize the hydrogen sulfide in a subsequent oxidation catalytic converter.

Functions which decide on the need for and possibility of deliberate generation of $NH_3$ and suitably predetermine the operating parameters, in particular the duration and extent of enrichment during the NSC regeneration, are preferably implemented in a corresponding control unit, which, by way of example, can also be used to control the combustion device, such as an internal combustion engine. The formation of $NH_3$ can typically be boosted by using a lower air ratio and a longer regeneration time, provided that the temperature of the $NO_x$ storage catalytic converter is in the range in which the formation of $NH_3$ is possible. Furthermore, during NSC regeneration the operation of the combustion device can be set in such a way, in a manner which is known per se, that high untreated $NO_x$ emission therefrom is achieved, and as a result the formation of $NH_3$ at the $NO_x$ storage catalytic converter is further boosted.

By using a suitable arrangement of the components, it is possible to adapt the maximum thermal loading which occurs in the individual components to the specific requirements. Moreover, by suitable arrangement it can be ensured that the temperatures of the individual components in driving operation are in a range which is favorable for the particular function. The rich-burn mode which is required for regeneration of the $NO_x$ storage catalytic converter can be realized by engine-internal measures or an additional post-engine introduction of reducing agents (e.g., fuel into the exhaust section upstream of the reformer), referred to below as secondary injection.

The post-engine supply of reducing agent upstream of the $NO_x$ storage catalytic converter can also be used to set rich conditions for NSC regeneration when the engine is operating with a lean exhaust gas. This preferably takes place when the engine is operating at between λ=1.0 and λ=1.2, since otherwise the quantity of reducing agent which needs to be supplied is too great. This has the advantage that a high untreated emission of $NO_x$ usually occurs in the range between $\lambda=1.0$ and $\lambda=1.2$, whereas these emissions are significantly lower at air ratios $\lambda<1$. Consequently, this method can be used to achieve a high $NO_x$ emission and therefore extensive formation of $NH_3$ during the NSC regeneration.

To avoid high CO and HC emissions during NSC regenerations with $\lambda<1$, if necessary secondary air can be blown in upstream of a subsequent oxidation catalytic converter. The secondary air may be provided, for example, by an electrically driven secondary air pump or a compressor or may be removed downstream of the compressor in the case of supercharged engines.

Another known exhaust gas aftertreatment method is what is known as the selective catalytic reduction method, also referred to as the SCR method for short. In this case, to reduce nitrogen oxides, a reducing agent with a selective action, typically ammonia, is added to the exhaust gas. The ammonia is temporarily stored in a corresponding nitrogen removal catalytic converter, referred to as SCR catalytic converter for short, and used by the latter to catalytically reduce nitrogen oxides ($NO_x$) contained in the exhaust gas to form nitrogen and water. At low temperatures, the efficiency of SCR catalytic converters is highly dependent on the $NO/NO_2$ ratio, with a maximum efficiency at an $NO_2$ content of approx. 50% for temperatures below 200° C. and a significantly reduced efficiency if the $NO_2$ content is lower. At higher temperatures above approx. 400° C., the nitrogen oxide reduction is limited by oxidation of ammonia, and moreover the ammonia storage capacity of the SCR catalytic converter decreases as the temperature rises. The overall result for SCR systems of this type is a useful temperature window for efficient lowering of the levels of nitrogen oxides of approximately 250° C. to approximately 550° C. SCR catalytic converters are subject to thermal ageing and should not be exposed to temperatures of over approx. 700° C. to 750° C. The lean-burn phases can be extended by the $NH_3$ stored in the SCR catalytic converter, which advantageously brings about fuel savings and at the same time improved ageing properties of the NSC catalytic converter. It has been found that the SCR catalytic converter can also be used to avoid $H_2S$ emission, which occurs, for example, during desulfating. Tests have shown that an SCR catalytic converter, on account of its specific properties, can oxidize hydrogen sulfide which is produced during desulfating to $SO_2$ even with a rich exhaust gas composition ($\lambda<1$). This makes it possible to avoid unpleasant odor pollution.

As a further particular feature, SCR catalytic converters can temporarily store hydrocarbons (HC) which are unburned at low temperatures and, if they contain vanadium pentoxide ($V_2O_5$), can also oxidize the hydrocarbons under rich conditions ($\lambda<1$). It is as a result usually possible to reduce the breakthrough of reducing agent during the NSC regeneration, and also, on account of its property of storing hydrocarbons at low temperatures, to contribute to lowering the HC emission levels after a cold start. In particular the emissions of possibly carcinogenic hydrocarbons, such as benzene, toluene, ethylbenzene and xylene, which may form during rich conditions at the $NO_x$ storage catalytic converter, can be lowered. The HC stored at low temperatures are released again at higher temperatures and can be oxidized at the SCR catalytic converter or a downstream oxidization catalytic converter. However, the high temperatures which are required for the oxidization of unburned hydrocarbons at the SCR catalytic converter lead to a deterioration in the ageing properties. This can be overcome by the invention, since the use of the reformer unit in the full flow, with the reformer unit simultaneously functioning as a reformer or reformate-generating unit, allows the synthesis gas content in rich-burn mode to be increased, while at the same time lowering the levels of HC emissions. As a further benefit, this leads to improved ageing properties in the SCR catalytic converter.

Typical SCR catalytic converters contain $V_2O_5$, $TiO_2$ and at least one of the components selected from the group consisting of tungsten oxide, molybdenum oxide, silicon dioxide and zeolites.

In a further advantageous embodiment of the invention for post-engine lowering of the levels of particulates, the reforming unit is designed as a catalytic particulate filter. This catalytically active diesel particulate filter is designed as a wall-flow filter. The reforming unit therefore extremely advantageously serves simultaneously as a reformer and as a particulate filter. In addition to the fact that it can be arranged in the full flow of exhaust gas, obviating the need for an additional filter unit, this also leads to a significantly more compact overall design. Moreover, combining or integrating two of the abovementioned functions in one component allows the space required to be considerably reduced.

This particulate filter retains the particulates which are emitted with a high degree of efficiency. The filter can be regenerated by various measures. Since particulates burn off at elevated temperatures, on the one hand the filter temperatures or the exhaust gas temperatures can be increased (e.g., by afterinjection of fuel into the exhaust section), or on the other hand the particulate ignition temperatures can be lowered by catalytic coating or by adding additives to the fuel, to ranges of <400° C., in which case the reduction of the ignition temperature leads to the required afterinjection time being shortened or to a reduction in the afterinjection quantity. A combination of various regeneration methods is also possible. In general, coated particulate filters are far superior to adding additives to the fuel with regard to emissions during the regeneration phase. When the layer of particulates is burnt off, which requires exhaust gas temperatures of over 550° C., $CO_2$ and steam are formed from the particulates. If the exhaust gas which reaches the particulate filter contains $NO_2$, oxidation of particulates by reaction with $NO_2$ is also already taking place in the temperature range from approximately 250° C. to 400° C. (CRT effect).

The reforming unit which simultaneously functions as a particulate filter contains, as support material for an exhaust gas catalytic converter, a ceramic monolith, for example of cordierite, a ceramic with the empirical formula $2MgO \times 2Al_2O_3 \times 5SiO_2$, silicon carbide (SiC) or other suitable materials. The catalytic coating mainly contains support oxides, further oxidic components, such as for example cerium oxide, and precious metals, which are applied to the ceramic monolith as an aqueous coating, also known as washcoat. The support oxides used may, for example, be $Al_2O_3$, $SiO_2$, $TiO_2$, zeolites or mixtures thereof, and elements from the rare earths or Zr, optionally in the form of oxides, may also be present in order to increase the specific surface area. In practice, in particular the precious metals have proven to be effective catalysts, in particular Pt, Rh, Pd, Ir, Ru and Ni.

The heating of the $NO_x$ storage catalytic converter for desulfating and of the particulate filter for thermal regeneration can be effected by engine-internal measures, including afterinjection of fuel into the combustion chamber. The regeneration of the $NO_x$ storage catalytic converter is carried out by means of the $H_2$ and CO formed in the reformer. In addition to the deliberately higher exhaust gas temperature, incompletely burnt hydrocarbons which remain in the exhaust gas lead to additional exothermicity on a catalytic converter which is optionally arranged close to the engine, thereby further raising the exhaust gas temperature. In addition or as an alternative, it is also possible for reducing agents (e.g., fuel) to be supplied in the exhaust section immediately upstream of the component(s) to be heated and/or upstream of an oxidization catalytic converter which precedes these components. This has the advantage that the heat losses caused by having to heat further upstream components and heat losses caused by cooling in the exhaust pipe are reduced. As a result, the energy consumption and therefore the increased fuel consumption for heating are reduced to a minimum. A further advantage is that in this way further upstream components are not exposed to high exhaust gas temperatures, and consequently their thermal ageing can be restricted to a minimum. Moreover, this prevents further upstream components, e.g., an upstream $NO_x$ storage catalytic converter, from leaving the temperature window which is required for a good efficiency as a result of being heated.

In the case of a catalytically coated particulate filter, a further advantage is that the conversion of fuel continues to be possible even, for example, after prolonged overrun phases of the internal combustion engine with a low exhaust gas temperature, on account of the high heat capacity of the particulate filter. By contrast, with a conventional catalytic converter, there is a risk of the temperature under similar conditions dropping below the light-off temperature on account of the low heat capacity, so that catalytic conversion of the hydrocarbons is no longer possible. In general, instead of supplying reducing agent (e.g., fuel) upstream of a catalytic converter, it is also possible to use other heating methods instead of supplying reducing agents downstream of the engine. Examples which may be mentioned include electrical heating of the particulate filter/reformer, as measures which are used as standard in practice.

In a particular feature of the invention, the at least one exhaust gas catalytic converter is arranged in the main exhaust gas stream downstream of the reformer reactor, the exhaust gas catalytic converter having the functions of an $NO_x$ storage catalytic converter and an SCR catalytic converter. Combining or integrating the two functionalities in one component again allows the space taken up to be considerably reduced.

In a preferred refinement of the invention, an oxidation catalytic converter is arranged downstream of in each case the last exhaust gas catalytic converter.

In a further configuration of the invention, a three-way catalytic converter is arranged immediately after the reforming unit, as seen in the main direction of flow of the exhaust gas.

In another advantageous refinement of the invention, the at least one exhaust gas catalytic converter, which is preferably a DENOX catalytic converter, is arranged in the main exhaust gas stream downstream of the reforming unit. The DENOX catalytic converter may, for example, contain zeolite, $Al_2O_3$ and/or perovskite as support material, and for example Pt, Cu or other suitable metals as catalytically active components.

According to a further advantageous design of the invention, an $NO_x$ storage catalytic converter is arranged upstream or downstream of the DENOX catalytic converter.

The method for operating an exhaust gas aftertreatment device of the invention allows reduction of nitrogen oxides in exhaust gases from motor vehicles by reduction at a catalytic converter in which hydrogen is supplied, the hydrogen which is required for the nitrogen oxide reduction being generated onboard the motor vehicle by steam reforming, partial oxidation of hydrocarbons and/or mixed forms thereof. In this case, according to the invention, the reforming is carried out directly in the main exhaust gas stream from an internal combustion engine. The steam and residual oxygen required for the reforming preferably originate from the exhaust gas.

In a preferred configuration of the method, the temperature of the reforming unit is set by means of the air/fuel ratio, with the current oxygen concentration in the exhaust gas being determined with the aid of a wide-band lambda sensor.

In accordance with the invention the reforming unit is operated at an air/fuel ratio in the range from approximately $0.5<\lambda<1.0$.

Furthermore, in accordance with a refinement of the method, a quantity of fuel which is fed to the reforming reactor is set engine-internally, by means of a secondary injection and/or by a combination of the two options.

It will be understood that the features described above and those which are yet to be explained below can be used not only in the combination given in each instance but also in other combinations or as stand-alone features without departing from the scope of the present invention.

Further advantages and configurations of the invention will emerge from the claims and the description. In particular, advantages result from a suitable combination or integration of various catalytic converter components as explained below.

The invention is explained in more detail below with reference to the drawing.

DETAILED DESCRIPTION OF THE DRAWINGS

Figure 1:
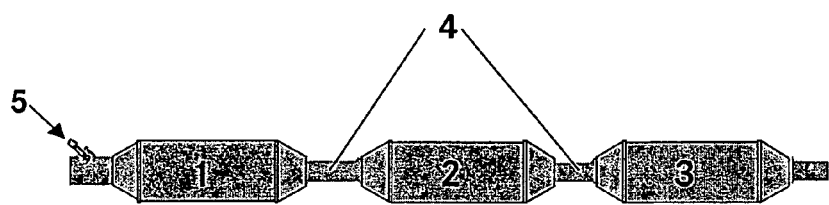
FIG. 1 shows a block diagram illustration of an exhaust gas aftertreatment apparatus in the full exhaust gas flow, which includes, in series, a reforming/particulate filter unit, an $NO_x$ storage catalytic converter and an SCR catalytic converter.

The exhaust gas aftertreatment device shown in FIG. 1 includes, as seen in the direction of flow of exhaust gas, downstream of an internal combustion engine (not shown), a reforming unit 1, which simultaneously acts as a particulate filter, an $NO_x$ storage catalytic converter 2 and an SCR catalytic converter 3 as components which purify the exhaust gas arranged in succession in the full flow of the exhaust section 4. A control unit (not shown in more detail) is used to control the internal combustion engine, which is preferably a diesel engine, and the exhaust gas aftertreatment device. Furthermore, not illustrated in more detail, temperature sensors, $NO_x$ sensors, lambda sensors, a device for supplying secondary air and pressure sensors may be arranged at suitable positions in the exhaust section 4. A device for supplying reducing agent 5 after the engine, also referred to as secondary injection, is arranged upstream of the reforming unit 1.

The internal combustion engine delivers exhaust gas which contains, inter alia, $NO_x$, particulates, CO and HC as unburned hydrocarbons. In lean-burn mode ($\lambda>1$), the reforming unit 1 behaves as a normal oxidation catalytic converter and CO and HC are oxidized to $CO_2$ and $H_2O$. The particulates which are present in the exhaust gas are retained in the reforming unit 1, which simultaneously acts as a particulate filter. Some of the particulates which have accumulated in the particulate filter are oxidized by reaction with $NO_2$, reducing $NO_2$ to NO. If the exhaust gas downstream of the $NO_x$ storage catalytic converter 2 still contains nitrogen oxides, these nitrogen oxides are mostly in the form of NO. In lean-burn mode, $NO_x$ is stored in nitrate form in the $NO_x$ storage catalytic converter 2. In rich-burn mode ($\lambda<1$), the reforming unit 1 delivers a CO—and $H_2$—containing synthesis gas mixture with a reduced HC content. Then, in rich-burn mode, accumulated $NO_x$ is desorbed and reduced using synthesis gas or CO and/or HC to form $N_2$. In addition, ammonia is also formed, in accordance with the equation $3.5H_2 + NO_2 \rightarrow NH_3 + 2H_2O$. This $NH_3$ can directly reduce the $NO_x$ formed in rich-burn mode at the subsequent SCR stage 3 in accordance with the equation $4NH_3 + 3NO_2 \rightarrow 3.5N_2 + 6H_2O$. Excess ammonia is stored by adsorption in the SCR catalytic converter 3. This allows $NO_x$ which is present already to be partially converted in lean-burn mode. This allows the lean-burn phases to be lengthened, with the advantage of fuel saving and improvement to the ageing properties of the $NO_x$ storage catalytic converter 2. An exhaust gas recirculation (not shown) may optionally be provided downstream of the reforming unit and upstream of the $NO_x$ storage catalytic converter 2. Consequently, in rich-burn mode, reformate can be fed to the engine combustion. This leads to a drop in the level of untreated emissions and at the same time reduces the fuel consumption. In rich-burn mode, the temperature of the reforming unit 1 is controlled by varying lambda. For a fast cold-start, the reforming unit can be provided with a heating function (e.g., electrical, flame glow plug, etc.).

It is optionally also possible to swap over the order of $NO_x$ storage catalytic converter 2 and an SCR catalytic converter 3 as components which purify the exhaust gas, with the result that the reduction of $NO_x$ at the SCR catalytic converter 3 takes place using $H_2$ or reformate instead of using $NH_3$.

An oxidization catalytic converter with an oxygen storage function connected downstream of both versions converts the hydrocarbons which still remain as the engine is switched from lean-burn to rich-burn mode, by means of stored $O_2$. A device for supplying secondary air (not shown) may also be connected upstream of the oxidation catalytic converter.

Heating measures can be applied to achieve temperatures which are sufficient at the components which purify exhaust gas, in particular at the $NO_x$ storage catalytic converter 2 and at the SCR catalytic converter 3, even during low-load operation, and thereby to achieve optimum reduction in the levels of $NO_x$. These heating measures may be engine-internal, e.g. a late shift in the main injection or afterinjection into the combustion chamber, or also post-engine, by supplying reducing agent upstream of the reforming unit 1 in order to generate exothermicity, provided that the $NO_x$ storage catalytic converter 2 has reached a sufficient temperature to convert the reducing agent. Furthermore, the exhaust pipe may be thermally insulated in order to minimize heat losses from the exhaust gas. By way of example, it is possible to use an air gap insulation. Further measures used to increase the exhaust gas temperature may include: increasing the idling speed, lengthening the afterglow time, connecting up additional electrical consumers or increasing the EGR rate. The abovementioned measures can be controlled, for example, by a control unit for controlling the engine and/or exhaust-gas purification components as a function of the input temperature signals or by means of a model. By way of example, models for the untreated $NO_x$ emission, the $NO_x$ storage properties of the $NO_x$ storage catalytic converter 2, the $NH_3$ formation at the $NO_x$ storage catalytic converter 2 and the $NH_3$ storage in the SCR catalytic converter 3, which define, inter alia, the criteria for an NSC regeneration, are stored in the control unit. The models can be adapted to the current ageing state of the catalytic converters on the basis of various sensor signals.

Thermal regenerations of the reforming unit 1, which also acts as a particulate filter, are required at regular intervals, so that the flow resistance is not increased by the particulate deposits, which would reduce the engine power. The layer of particulates is burnt off, with $CO_2$ and steam being formed from the particulates. The combustion of particulates normally requires temperatures of over 550° C. However, with a catalytic particulate filter, it is possible to lower the particulate is ignition temperature into the range below 400° C. The reaction takes place in a similar way to in a CRT system, i.e. NO is converted into $NO_2$ which reacts with the particulates. By way of example, a supply of reducing agent downstream of the engine can be used to heat the particulate filter 1.

Figure 2:
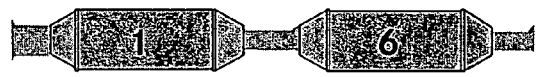
FIG. 2 shows a block diagram illustration of an exhaust gas aftertreatment apparatus in the full flow of exhaust gas, which includes, in series, a reforming/particulate filter unit and an integrated exhaust gas catalytic converter with an $NO_x$ storage and SCR catalytic converter function.

The exemplary embodiment illustrated in FIG. 2 differs from that shown in FIG. 1 by virtue of the fact that the exhaust gas purification components $NO_x$ storage component 2 and the one SCR catalytic converter 3 arranged downstream in the full flow of the exhaust gas are combined to form an integrated exhaust gas catalytic converter 6. This has the advantage that an integrated solution avoids the temperature drop in the exhaust pipe which occurs in the case of catalytic converters connected in series. An advantage in this case is that this measure considerably reduces the space taken up. Moreover, both functional components reach the required operating temperature very quickly after a cold start, so that there is no need for any additional heating measures, which would increase the fuel consumption. In the integrated nitrogen oxide storage and SCR catalytic converter, a significant proportion of the nitrogen oxides contained in the exhaust gas is temporarily stored, while the remainder is reduced by ammonia which has been temporarily stored therein. In this case too, an oxidation catalytic converter with an oxygen storage function can be connected downstream of a device for supplying secondary air connected upstream of this catalytic converter.

The exhaust gas catalytic converter which is in integrated form may generally be in the form of a honeycomb body designed as an unsupported extrudate; this means that the components of the catalytic converter are processed to form an extrudable compound and then extruded to form honeycomb bodies. A catalytic converter of this type consists of catalyst material all the way through and is therefore also referred to as a full catalyst. In the present case, SCR catalyst component 3 can be extruded to form a honeycomb body, and the $NO_x$ storage catalyst component 2 can be applied to the walls of the flow passages in the form of a coating. The person skilled in the art will be aware of the techniques used for this purpose. However, the $NO_x$ storage catalytic converter 2 and the SCR catalytic converter 3 may also be applied in the form of a coating to the walls of the flow passages of catalytically inert support bodies in honeycomb form. The inert support bodies preferably consist of cordierite. In a further embodiment of the catalytic converter, the $NO_x$ storage catalyst component 2 and the SCR catalyst component 3 are applied to the inert support body in two separate layers, with the $NO_x$ storage catalyst component 2 preferably being arranged in the lower layer which bears directly against the support body, and the SCR catalyst component 3 preferably being arranged in the upper layer, which comes into direct contact with the exhaust gas.

Figure 3:
FIG. 3 shows a block diagram illustration of an exhaust gas aftertreatment apparatus in the full flow of exhaust gas, which includes, in series, a reforming/particulate filter unit, a three-way catalytic converter, an $NO_x$ storage catalytic converter and an SCR catalytic converter.

The exhaust gas aftertreatment device which has already been described in FIG. 1, with a reforming unit 1 which simultaneously acts as a particulate filter, an $NO_x$ storage catalytic converter 2 and an SCR catalytic converter 3 as components which purify the exhaust gas, as a further embodiment in the example shown in FIG. 3, also has a three-way catalytic converter (TWC) 7 connected directly upstream of the NSC catalytic converter 2. This functions firstly as an additional $NH_3$ generator, by using the $H_2$ or reformate delivered by the reforming unit 1 to contribute to the reduction of nitrogen oxides, and secondly, on account of its oxygen storage function, it is able to partially oxidize unburned hydrocarbons, so that it contributes to significantly increasing the efficiency of the SCR catalytic converter 3. In this exemplary embodiment too, the SCR catalytic converter 3 may be connected upstream of the $NO_x$ storage catalytic converter 2, so that the TWC catalytic converter 7 is connected upstream of the SCR catalytic converter. In a further variant, the two components SCR catalytic converter 3 and $NO_x$ storage catalytic converter may be designed as an integrated exhaust gas catalytic converter 6, upstream of which the TWC catalytic converter 7 is connected.

Figure 4:
FIG. 4 shows a block diagram illustration of an exhaust gas aftertreatment apparatus in the full flow of exhaust gas, which includes, in series, a reforming/particulate filter unit and an HC-DENO$_x$ storage catalytic converter.
Figure 5:
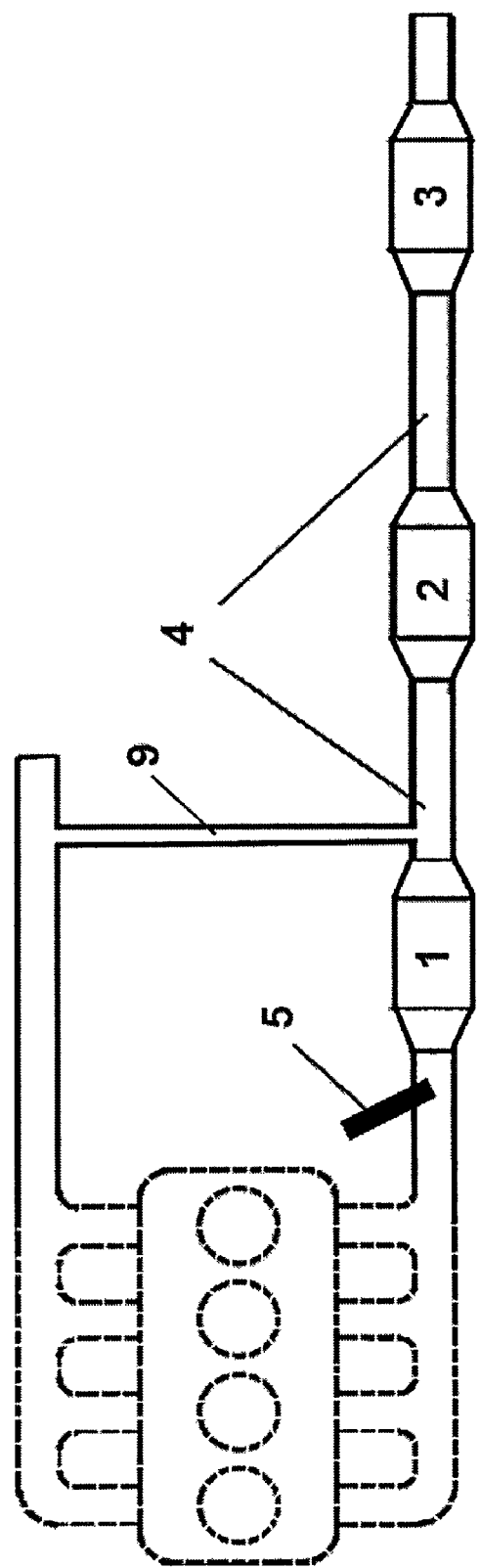
FIG. 5 shows a block diagram illustration of an exhaust gas aftertreatment apparatus in the full flow of exhaust gas 4, which includes, in series, a secondary injection device 5, a reforming/particulate filter unit 1, an exhaust gas recirculation 9, a $NO_x$ storage catalytic converter 2, and an SCR catalytic converter 3.
Figure 6:
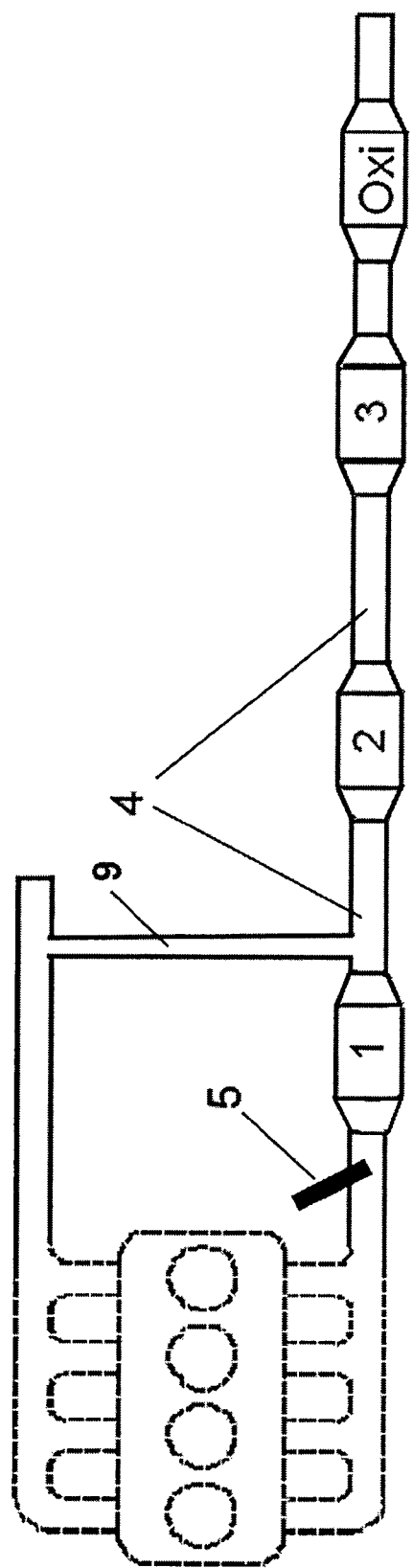
FIG. 6 shows a block diagram illustration of an exhaust gas aftertreatment apparatus in the full flow of exhaust gas 4, which includes, in series, a secondary injection device 5, a reforming/particulate filter unit 1, an exhaust gas recirculation 9, a $NO_x$ storage catalytic converter 2, an SCR catalytic converter 3, and a oxidation catalytic converter (Oxi).
Figure 7:
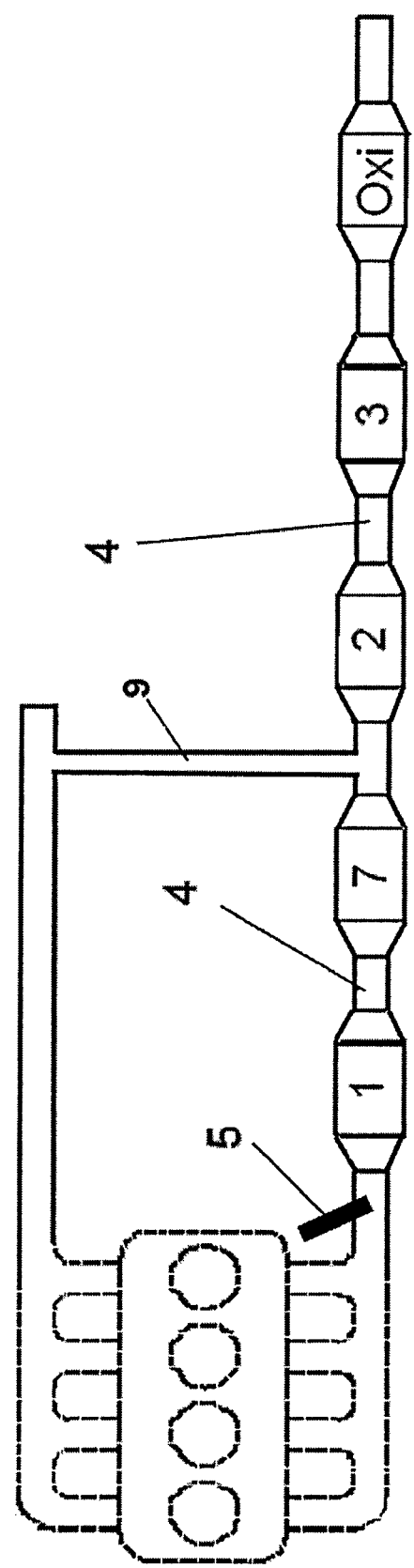
FIG. 7 shows a block diagram illustration of an exhaust gas aftertreatment apparatus in the full flow of exhaust gas 4, which includes, in series, a secondary injection device 5, a reforming/particulate filter unit 1, a three way catalytic converter 7, an exhaust gas recirculation 9, a $NO_x$ storage catalytic converter 2, an SCR catalytic converter 3, and a oxidation catalytic converter (Oxi).
Figure 8:
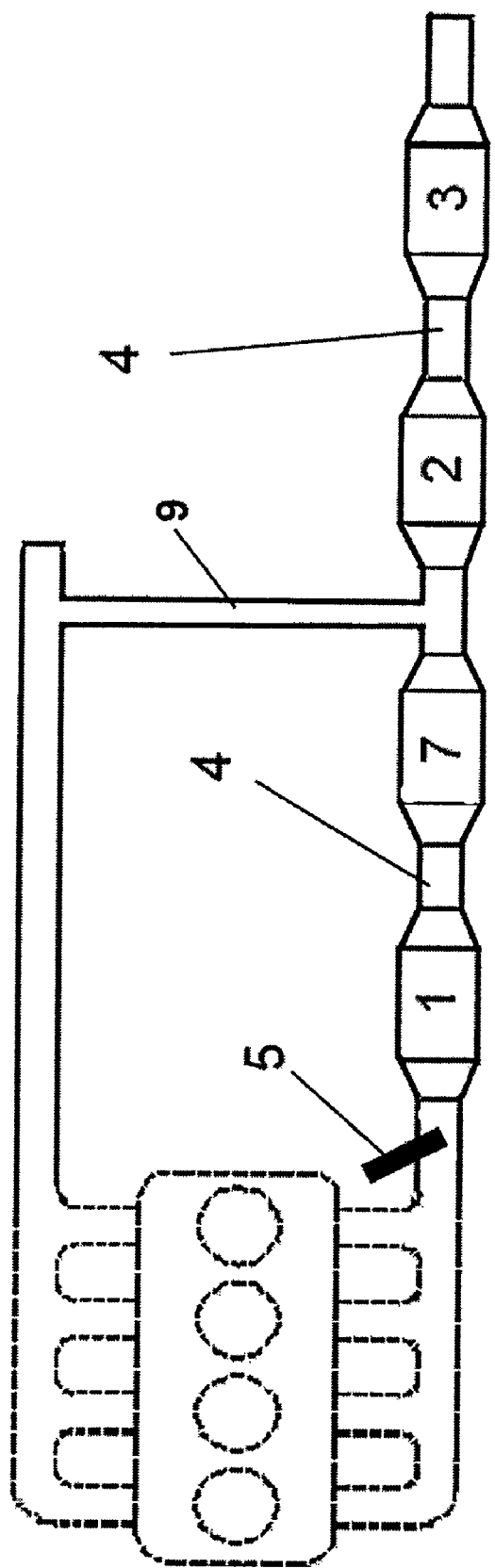
FIG. 8 shows a block diagram illustration of an exhaust gas aftertreatment apparatus in the full flow of exhaust gas 4, which includes, in series, a secondary injection device 5, a reforming/particulate filter unit 1, an exhaust gas recirculation 9, a $NO_x$ storage catalytic converter 2, and an SCR catalytic converter 3.
Figure 9:
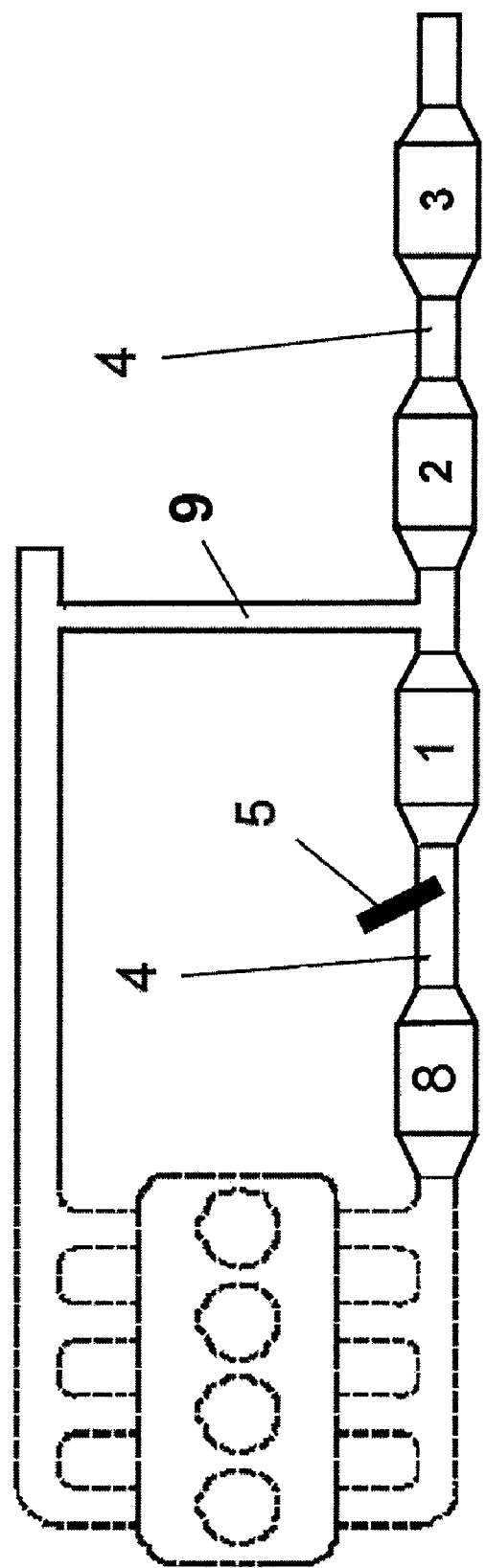
FIG. 9 shows a block diagram illustration of an exhaust gas aftertreatment apparatus in the full flow of exhaust gas 4, which includes, in series, a catalytic converter 8, a secondary injection device 5, a reforming/particulate filter unit 1, an exhaust gas recirculation 9, a $NO_x$ storage catalytic converter 2, and a SCR catalytic converter 3.

FIG. 4 shows a further variant of an exhaust gas aftertreatment device, in which an HC-DENOX catalytic converter 8 is arranged downstream of the reforming unit 1, in the full flow of the exhaust section. It replaces the "NSC catalytic converter with downstream SCR catalytic is converter" variant, catalysing the nitrogen oxide reduction by means of HC. In order also to maximize the conversion of nitrogen oxides, it is possible for an $NO_x$ storage catalytic converter 2 to be arranged immediately upstream or downstream of the HC-DENOX catalytic converter.

The invention claimed is:

1. An exhaust gas aftertreatment device for a motor vehicle, said device comprising:
    a reforming unit that generates hydrogen by steam reforming and partial oxidation of hydrocarbons, said reforming unit being arranged directly, in the full flow of exhaust gas, in a main exhaust gas stream of an internal combustion engine, whereby steam and residual oxygen that are necessary for reforming are derived from said exhaust gas, wherein the reforming unit is configured as an autothermal reforming reactor and wherein the reforming unit comprises a catalytically active particulate filter;
    an $NO_x$ storage catalytic converter arranged in the main exhaust gas stream downstream of the reforming unit said $NO_x$ storage catalytic converter being operable to remove $NO_x$ from lean exhaust gas by storing $NO_x$ as the lean exhaust gas flows through $NO_x$ storage catalytic converter, and to generate $N_2$ by reducing stored $NO_x$ when reducing exhaust gas flows through the $NO_x$ storage catalytic converter;
    an SCR catalytic converter arranged in the main exhaust gas stream downstream of the $NO_x$ storage catalytic converter said SCR catalytic converter being operable to reduce $NO_x$ contained in the exhaust gas using $NH_3$ that has been generated by the $NO_x$ storage catalytic converter, and a secondary injection device arranged upstream of the reforming unit being operable for post-engine introduction of reducing agents into the exhaust gas upstream of the reformer; and
    an exhaust gas recirculation, arranged between the $NO_x$ storage catalytic converter and the reforming unit, the exhaust gas recirculation being operable to supply reformate to the engine.

2. The exhaust gas aftertreatment device as claimed in claim 1, further comprising an oxidation catalytic converter that is arranged downstream of the SCR catalytic converter.

3. The exhaust gas aftertreatment device as claimed in claim 2, further comprising a three-way catalytic converter that is arranged immediately downstream of the reforming unit.

4. The exhaust gas aftertreatment device as claimed in claim 1, further comprising a three-way catalytic converter that is arranged immediately downstream of the reforming unit.

5. A method for operating an exhaust gas aftertreatment device, the method comprising:
    using hydrogen to reduce $NO_x$ in exhaust gas from an internal combustion engine of a motor vehicle by way of a catalytic converter;
    generating the hydrogen onboard the motor vehicle in the full flow of exhaust gas by steam reforming and partial oxidation of hydrocarbons in an autothermal reforming process; wherein steam and residual oxygen that are necessary for the reforming are supplied from the exhaust gas;
    the reforming is performed by a reforming unit, comprising a catalytically active particulate filter, arranged directly in full flow of exhaust gas, in a main exhaust gas stream from the internal combustion engine; and setting a quantity of fuel which is fed to the reforming unit via a secondary injection into the full flow of exhaust gas upstream of the reformer, and;
    supplying reformate to the engine, by way of an exhaust gas recirculation operably arranged between the $NO_x$ storage catalytic converter and the reforming unit.

6. The method as claimed in claim 5, further comprising setting the temperature of the reforming unit by an air/fuel ratio and determining oxygen concentration in the exhaust gas using a wide-band lambda sensor.

7. The method as claimed in claim 6, further comprising operating the reforming unit at an air/fuel ratio in the range from approximately $0.5 < \lambda < 1.0$.

8. The exhaust gas aftertreatment device of claim 1 further comprising a catalytic converter arranged closed to the engine.

9. The exhaust gas aftertreatment device of claim 1 wherein the $NO_x$ storage catalytic converter is configured to generate $NH_3$ by reduction of accumulated $NO_x$ with $H_2$.

10. The exhaust gas aftertreatment device of claim 1, wherein the main exhaust gas stream flows in a single flow path that includes the reforming unit, the $NO_x$ storage catalytic converter and the SCR catalytic converter.

11. The method of claim 5, wherein the full flow of the main exhaust gas stream follows in a single flow path.

\* \* \* \* \*